US005559542A

United States Patent [19]

Tsukuda

[11] Patent Number: 5,559,542

[45] Date of Patent: Sep. 24, 1996

[54] INK JET HEAD, RECORDING APPARATUS PROVIDED WITH SUCH A HEAD, AND METHOD FOR MANUFACTURING HEAD

[75] Inventor: Keiichiro Tsukuda, Kawasaki, Japan

[73] Assignee: Canon Kabushiki Kaisha, Tokyo, Japan

[21] Appl. No.: 49,315

[22] Filed: Apr. 21, 1993

[30] Foreign Application Priority Data

Apr. 22, 1992 [JP] Japan .................................... 4-103181

[51] Int. Cl.$^6$ .................................... G01D 15/18

[52] U.S. Cl. .................................... 347/58; 347/63; 29/611

[58] Field of Search .................................... 347/58, 59, 63, 347/64, 65, 50; 29/611

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,881,318 | 11/1989 | Kumuro et al. | 347/63 |
| 4,922,269 | 5/1990 | Ikeda et al. | 347/58 |
| 5,227,812 | 7/1993 | Watanabe et al. | 347/63 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |

*Primary Examiner*—Valerie A. Lund
*Attorney, Agent, or Firm*—Fitzpatrick, Cella, Harper & Scinto

[57] ABSTRACT

An ink jet head comprises an discharging element having discharging ports to discharge ink, ink passages conductively connected to the foregoing discharging ports, and exothermic elements giving thermal energy to ink distributed in the ink passages, and at least a part of such an element is covered with a silicone resin, the amount of low molecular siloxane content of which is 500 ppm or less. Thus, in a thermal jet recording head, the low molecular siloxane divergence is lowered in its process of hardening or after hardening to enable the reduction of the occurrence frequency of the abnormal ink foaming, contributing to the improvement of the reliability of the thermal jet recording head as well as to the improvement of the yield in its fabrication.

13 Claims, 6 Drawing Sheets

INK JET HEAD, RECORDING APPARATUS PROVIDED WITH SUCH A HEAD, AND METHOD FOR MANUFACTURING HEAD

BACKGROUND OF THE INVENTION

1. Field of the Invention

The present invention relates to an ink jet head, a method for manufacturing such a head, and a recording apparatus provided with such a head. Particularly, the invention relates to an ink Jet head wherein at least a part of its head is sealed with resin, a method for manufacturing such an ink jet head, and ink jet recording apparatus using such a head.

2. Related Background Art

An ink jet recording method in which a recording is performed by generating ink droplets and causing them to adhere to a recording medium such as paper, plastic, and cloth is a recording method which makes extremely limited noises at the time of recording, is capable of performing a high-speed recording, and using an ordinary paper sheet. Among such methods, the so-called thermal jet recording method which utilizes an exothermic element for generating energy thereby to discharge ink for recording attracts a particular attention in recent years.

As a method for manufacturing the thermal jet recording head, there is known a method to fabricate the discharging element which constitutes the principal part of the so-called thermal jet recording head in such a manner that heat generating or exothermic elements and wirings for the exothermic elements are formed on a silicone substrate by the application of the thin film technology, for example; the grooved walls for ink passage and the wall for a common ink chamber are formed by a photo-lithography process using a photosensitive resin; a flat cover made of glass or the like is coupled to the walls; the discharging element having a filter bonded to the inlet of the common ink chamber is fixed to a base plate together with a PCB; the electrical connection between the discharging element and the PCB is made by a wire bonding or other methods; lastly, a front cover and an ink inlet member are fixed, and then, a sealing agent such as a silicone resin is filled in for the purpose of assuring its liquid tightness and air tightness. FIG. 1 to FIG. 3 are views illustrating the structure of the above-mentioned thermal jet recording head, respectively.

FIG. 1 illustrates the structure of the discharging elements. On a silicone substrate 101, an exothermic element 103 and a wiring 102 for the exothermic element are formed by the application of the thin film technology.. Further, the grooved walls for ink passage and the wall 104 for a common ink chamber are formed by a resin such as a photosensitive resin. On the upper end of the walls, a glass plate having a common ink inlet 107 is bonded. The common ink inlet provided for the glass plate 105 is covered by a filter 106 which is bonded to the glass plate 105.

FIG. 2 is a schematic view showing the structure of a thermal jet recording head. A discharging element 201 and a PCB (printed circuit board) 202 are adhesively fixed to a base plate 203 which serves as a supporting member to support the discharge element. Both of them are electrically connected by a wire bonding 206. To this, a front cover 204 having an ink inlet member 205 and a discharging window 207 mounted thereon is coupled, and as shown in FIG. 3, a silicone resin 301 is filled in for the purpose of assuring its liquid tightness and air tightness to complete a thermal jet recording head.

As described above, in order to fill in the gaps resulting from the adhesion of the discharging element and base plate, and the front cover and base plate, a silicone RTV (a type of silicone which is hardened at room temperature) is employed as an adhesive and sealing agent. The reason why it is employed is that this type of silicone has the following advantage:

(1) the silicone RTV is hardened in a rubber like state thereby to protect the discharging element from damages caused by a thermal shock and the like;

(2) hardening begins rapidly at the surface and there is no possibility that the filter and nozzles are clogged due to liquid drips, inverted flow, or the like; and (3) being monoliquid, and hardening being completed in several hours at normal temperature and moisture, this silicone has an excellent operativity among others.

Nevertheless, there are encountered among the thermal jet recording heads fabricated as in the example mentioned above, the defective products having a problem of unstable discharging performance. This has been the task to be solved. Along with the increasing demand on an image formation which requires more preciseness, particularly on the formation of the highly precise color image recently, this task is the subject to which more attention is being given.

As a result of the detailed examinations to find the causes of the unstable discharging performance and other defects, the present inventor has found the following fact:

One of the components of the silicone RTV used as a sealing agent and adhesive agent, low molecular siloxane is caused to diverge in an extremely fine quantity in a process of being hardened or after hardened and adhere to the surface of the exothermic element and others. Particularly, when it is caused to adhere to the surface of the exothermic element in a film like state, the generation of "air bubbles" required to discharge liquid becomes insufficient, resulting in the irregularity of the speed at which to discharge ink droplets, the irregularity of the volume thereof, or the like, so that the normal ink discharging is hindered. Consequently, the degradation of dot positional precision (the so-called biased dots), defective dot sizes, and the like occur, and it is found that these are causes for the hindrance to stabilizing the recording. Also, the biased ink discharging is particularly caused by the fact that the low molecular siloxane adhering to the surface where the discharge ports are arranged affects the wettability of the surface. Thus, when a thermal jet is used, the adhesion of the low molecular siloxane directly produces an adverse effect on the performance of the ink discharging. Also, the silicone RTV currently available on the market or being used in general always diverges the low molecular siloxane in the process of being hardened or after hardened. There is no exception. Therefore, the elimination of the disadvantages brought about by the low molecular siloxane in using the silicone RTV has been a major problem to be solved.

SUMMARY OF THE INVENTION

It is an object of the present invention to solve the above-mentioned problem and provide an ink jet head having an excellent ink discharging performance even when a silicone resin is used for the recording head, a method for manufacturing such a head, and an ink jet apparatus provided with such a recording head.

In order to achieve the above-mentioned object, the present inventor has given his attention to the $D_3$ to $D_{10}$ siloxane having low molecular weight which is considered to have a particular relationship with an abnormal ink foaming, and has made a thorough study on the relationship between the amount of content of the low molecular siloxane in the silicone RTV and the occurrence frequency of the abnormal ink foaming. Here, in this respect, a particular attention is given to the $D_3$ to $D_{10}$ low molecular siloxane. As a result, it has been discovered that a thermal jet recording head having an excellent discharging performance is obtainable when the amount of content of the low molecular siloxane in the silicone RTV is 500 ppm or less, hence leading to the completion of the present invention.

In other words, according to the present invention, there is provided an ink jet recording head comprising a discharging element having discharging ports to discharge ink, ink passages conductively connected to the foregoing discharging ports, and exothermic elements giving thermal energy to ink distributed in the ink passages, at least a part of such an element being covered with a silicone resin, the amount of low molecular siloxane content of which is 500 ppm or less.

Also, according to such an ink jet head, the amount of the low molecular siloxane content in the silicone resin is 400 ppm or less.

The foregoing discharging element of an ink jet head according to the present invention is supported on a supporting substrate, and at least a part of the foregoing discharging element is covered with the above-mentioned silicone resin together with at least a part of the foregoing supporting substrate.

The discharging of ink by an ink jet head according to the present invention is performed in such a manner that air bubbles are generated in ink by film boiling due to heat generated by each of the foregoing exothermic resistance layers, and then, the ink is discharged by the pressure thus exerted at the time of the air bubble being generated.

Furthermore, an ink Jet head according to the present invention is provided with an discharging element comprising discharging ports to discharge ink, ink passages conductively connected to the foregoing discharging ports, exothermic elements to give thermal energy to ink distributed in the foregoing ink passages, and wirings to supply signals to the foregoing discharging element, and at least a part of the foregoing wirings is covered with a silicone resin, the amount of the molecular siloxane content of which is 500 ppm or less.

Also, according to the present invention, the silicone resin to cover at least a part of the foregoing wiring contains the low molecular siloxane in an amount of 400 ppm or less.

The foregoing discharging element of an ink jet head is supported on a supporting substrate, and at least a part of the foregoing discharging element is covered with the above-mentioned silicone resin together with at least a part of the foregoing supporting substrate..

Also, the discharging of ink by the foregoing ink jet head is performed in such a manner that air bubbles are generated in ink by film boiling due to heat generated by each of the foregoing exothermic resistance layers, and then, the ink is discharged by the pressure exerted at the time of the air bubble being generated. Also, there are provided for an ink jet apparatus according to the present invention, an ink jet recording head, means for supplying signals given to the foregoing discharging element, and a method for filling ink in the foregoing ink jet head.

BRIEF DESCRIPTION OF THE DRAWINGS

The above-mentioned object, features, and advantages of the present invention will become more apparent by reference to the following detailed description of the invention taken in conjunction with the accompanying drawings, wherein.

DETAILED DESCRIPTION OF THE PREFERRED EMBODIMENTS

Hereinafter, the present invention will be described in detail.

Figure 1:
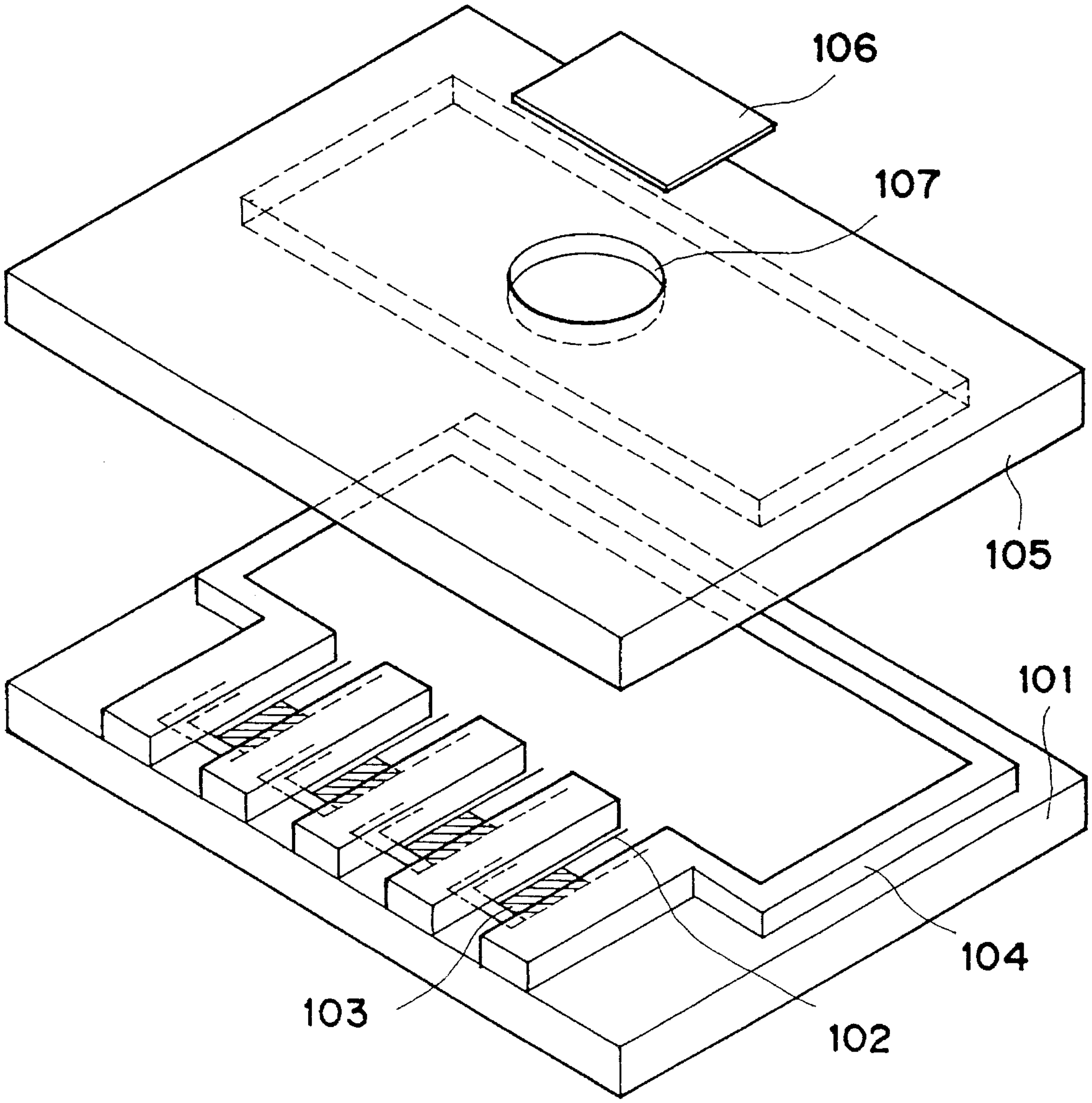
FIG. 1 is a schematic view showing the structure of the discharging element unit of an ink jet recording head according to the prior art.
Figure 2:
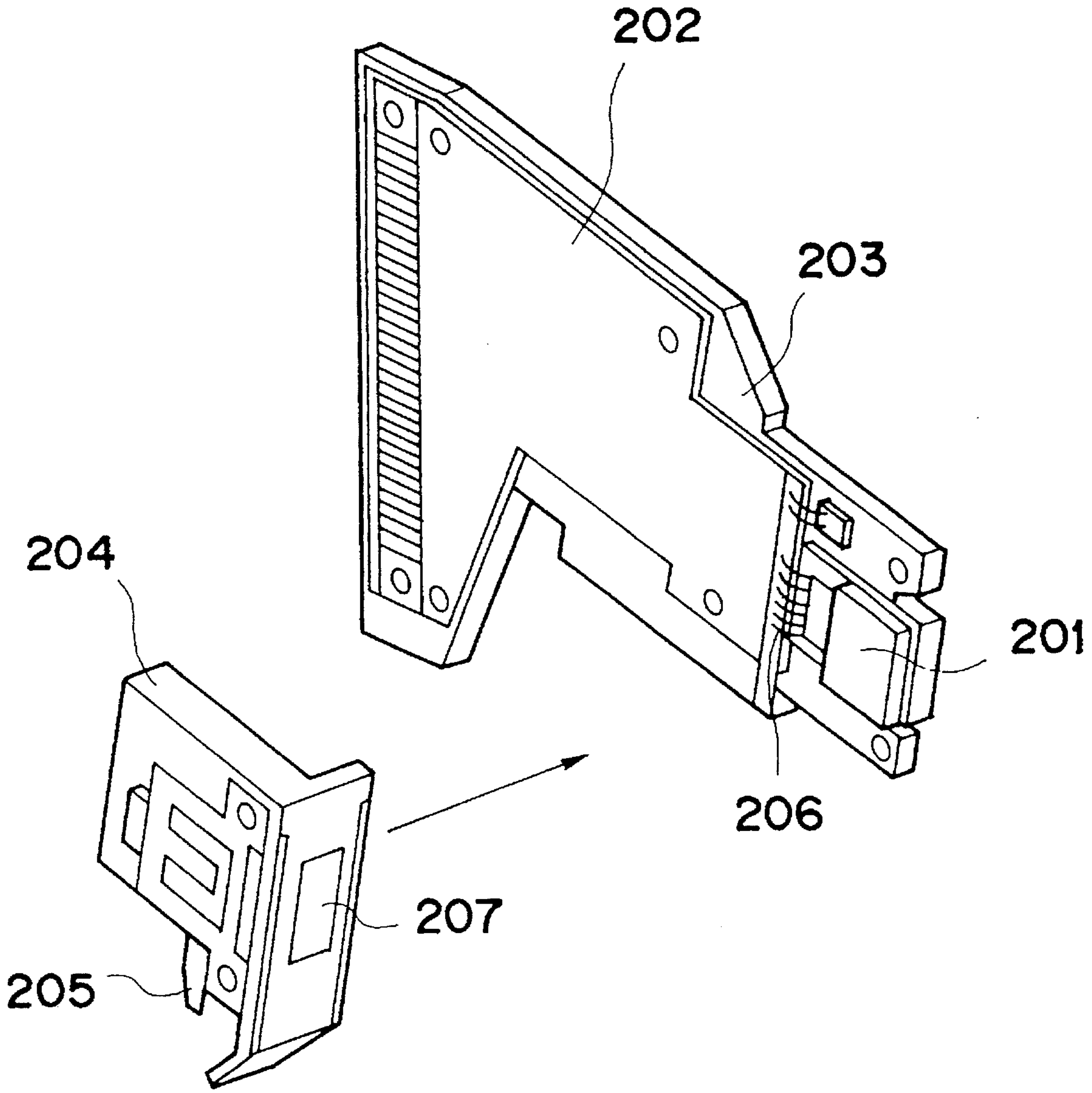
FIG. 2 is a schematic view showing the structure of an ink jet recording head according to the prior art.
Figure 3:
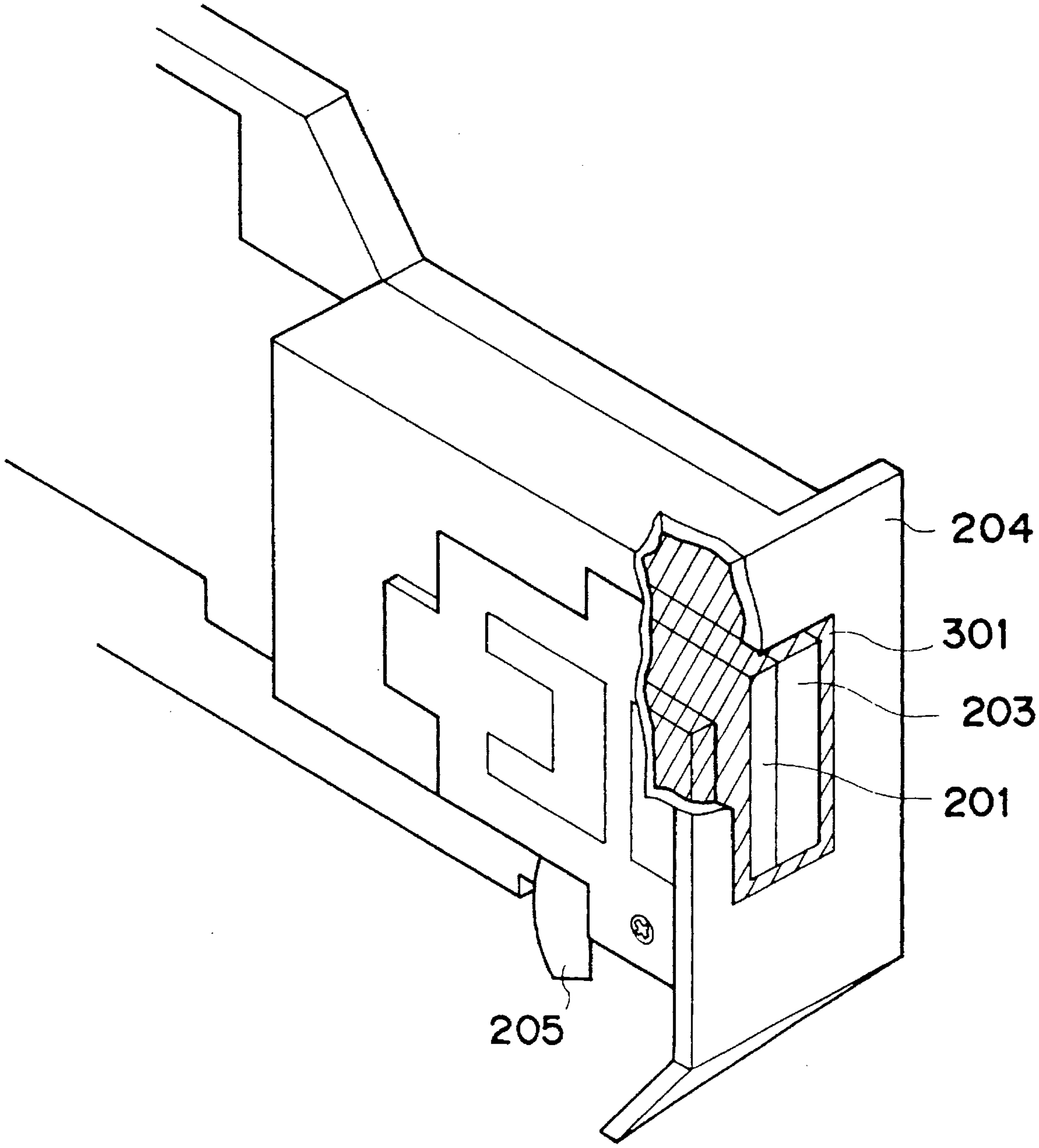
FIG. 3 is an enlarged view showing the structure of an ink jet recording head sealed by a silicone resin.
Figure 4:
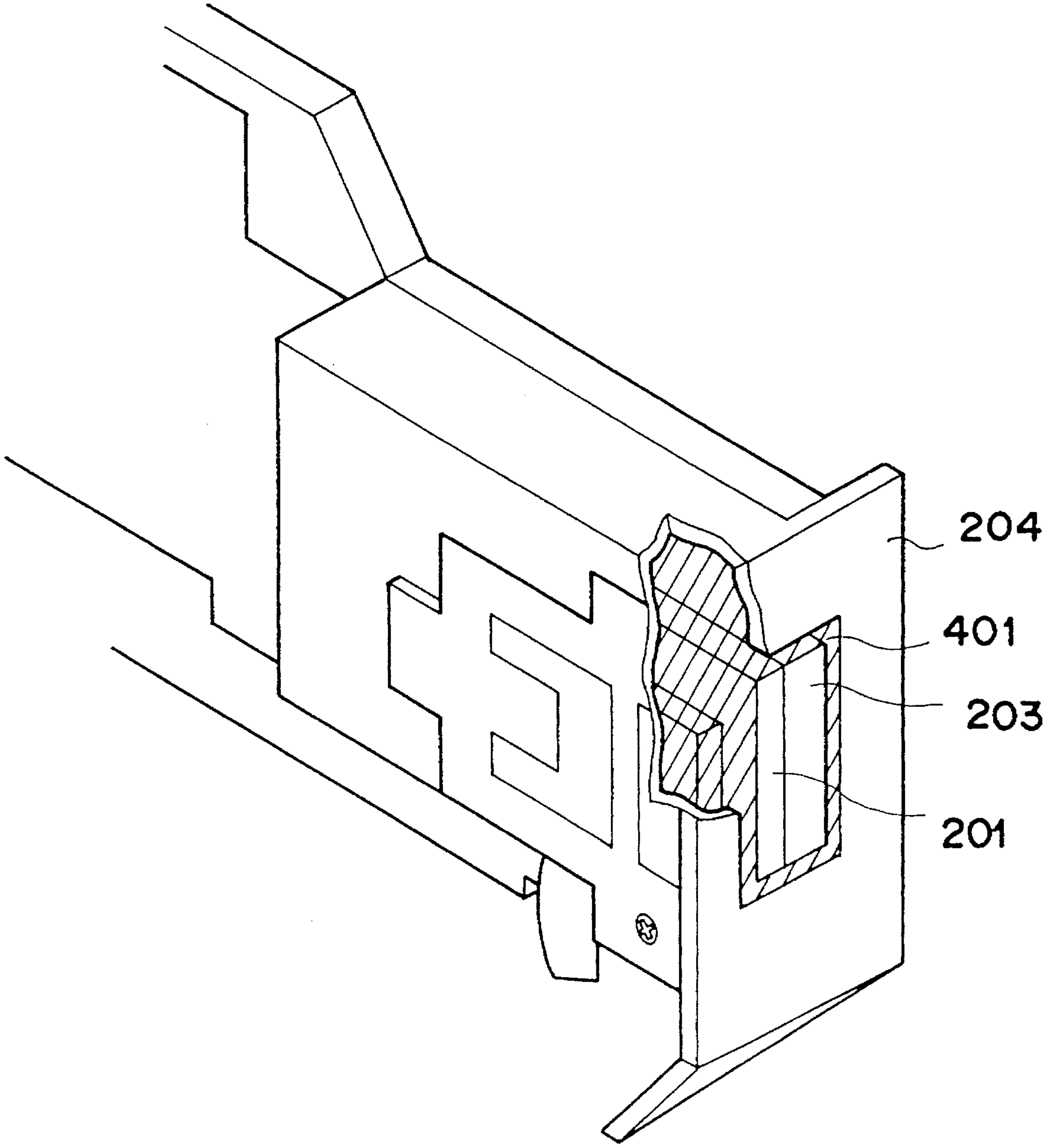
FIG. 4 is a schematic view showing an example of the structure of an ink jet recording head according to the present invention.

FIG. 4 is a structural view illustrating a thermal jet recording head used as an example on which to examine the present invention. In FIG. 4, a reference numeral 203 is a base plate; 201, a discharging element; and 204, a front cover provided with a discharging window 207. This recording head is made by filling in a silicone resin 401 between the front cover and one end of the base plate where the discharging element is adhesively bonded, and sealing them.

The above-mentioned recording head is of the following specification:

Dot pitch 360 DPI

Driving frequency 4.0 kHz

Number of nozzles 48 nozzles

As the energy generating elements to cause recording droplets to be discharged, electrothermal transducers are used.

In a head structured as above, the following examination is carried out in order to examine the correlation between the amount of content of the low molecular siloxane in the silicone resin and the ratio of the abnormal ink foaming:

As sealing agents, 26 kinds of silicone RTV having different amounts of low molecular siloxane contents are used for fabricating 20 each of the recording heads structured as above. Also, as reference specimens, 20 recording heads are prepared without using any sealing agent.

For silicone RTV, it is possible to prepare the silicone RTV wherein the amount of contents of $D_3$ to $D_{10}$ low molecular siloxane (its structural formula being $[(CH_3)_2SiO]_x$) are reduced by evaporation or means of volatilization or the like in vacuum without changing any other components. The silicone RTV used as examples for the examination this time are the one available on the market which has a comparatively large amount of low molecular siloxane content, and the resins serving as the respective specimens which are prepared from the foregoing RTV currently available on the market by reducing two kinds of low molecular siloxane using the foregoing means.

The measurement of the low molecular siloxane contents in the silicone RTV is carried out as follows:

At first, 1 g of the silicone RTV is hardened by leaving it for 72 hours at normal temperature and in normal moisture. This is immersed in 10 g of carbon tetrachloride, and a 12-hour extraction is conducted. Then, the amounts of $D_3$ to $D_{10}$ low molecular siloxane in the extracted liquid are taken by a gas chromatography.

Thus, the studies are made on the relationship between the amount of contents of the low molecular siloxane in the silicone RTV thus obtained, the ratio of the abnormal ink foaming of the heads fabricated using the respective silicone resins containing different amounts of the low molecular siloxane, and the occurrence frequency of the twisted ink discharging. The results are shown in Table 1.

In this respect, the twisted ink discharging is evaluated in terms of the precision with which the ink is impacted on a specific point. The evaluation is classified in three stages, and in the Table, the mark (0) indicates that no twisting is observed; the mark (Δ) indicates that there is twisting observed but within an allowable standard; and (X) indicates that the observed twisting is out of the standard, respectively.

TABLE 1

| Low molecular siloxane content (ppm) | Abnormal ink foaming ratio of generation | Twisted discharge |
|---|---|---|
| 3000 | 3/20 | Twisting × 2/20<br>Δ 5/20 |
| 1000 | 1/20 | Twisting × 1/20<br>Δ 5/20 |
| 800 | 1/20 | Twisting × 1/20<br>Δ 3/20 |
| 600 | 1/20 | Twisting Δ3/20 |
| 500 | 0/20 | Twisting Δ1/20 |
| 400 | 0/20 | O No twisting |
| 300 | 0/20 | O No twisting |
| 200 | 0/20 | O No twisting |
| 100 | 0/20 | O No twisting |
| No silicone RTV sealing agent | 0/20 | O No twisting |

From the Table 1, it is clear that when the low molecular siloxane content in the silicone RTV is 500 ppm or less, the ratio of the abnormal ink foaming is zero for the 20 specimens. Also, regarding the twisted ink discharge, it is clear that there is no deviation or twisting when the low molecular siloxane content is 400 ppm or less.

Now, hereinafter, the description will be made further in detail of an ink jet recording head according to the present invention and an ink jet recording apparatus using such a recording head.

The present invention produces an excellent effect on an ink jet recording head and recording apparatus, particularly on those employing a method to utilize thermal energy for the formation of flying ink droplets in order to perform recording.

Regarding the typical structure and operational principle of such a method, it is preferable to adopt those which can be implemented using the fundamental principle disclosed in the specifications of U.S. Pat. Nos. 4,723,129 and 4,740,796. This method is applicable both to the so-called on-demand type recording system and a continuous type recording system.

To describe this recording system briefly, at least one driving signal which provides a rapid temperature rise for a liquid (ink) a beyond departure from nucleation boiling point in response to recording information is applied to an electrothermal transducer disposed on a liquid (ink) retaining sheet or liquid passage, thus causing the electrothermal transducer to generate thermal energy to produce film boiling on the thermoactive portion of the recording head, leading effectively to the resultant formation of a bubble in the recording liquid (ink) one to one for each of the driving signals. Consequently, this method is particularly suitable to the recording system of an on-demand type. By the development and contraction of the bubble, the liquid (ink) is discharged through a discharging port to produce at least one droplet. The driving signal should preferably be in the form of pulses because the development and contraction of the bubble can be effectuated instantaneously, and, therefore, the liquid (ink) is discharged particularly in an excellent condition with quicker responses. The driving signal in the form of pulses is preferably such as disclosed in the specifications of U.S. Pat. Nos. 4,463,359 and 4,345,262. In this respect, if the conditions disclosed in the specification of U.S. Pat. No. 4,313,124 regarding the rate of temperature increase of the thermically activated surface is preferably adopted, it is possible to perform an excellent recording in a state further improved.

The structure of the recording head may be adopted as shown in each of the above-mentioned specifications wherein the structure is arranged to combine the discharging ports, liquid passages, and electrothermal transducers as disclosed in the above-mentioned patents (linear type liquid passage or right angle liquid passage). Besides, a structure such as disclosed in the specifications of U.S. Pat. Nos. 4,558,333 and 4,459,600 wherein the thermically activated portions are arranged in a curved area is included in the present invention.

Also, it is possible for the present invention to adopt effectively a structure such as disclosed in Japanese Laid-Open Application No. 59-123670 wherein a common slit is used as the discharging ports for plural electrothermal transducers as well as a structure such as disclosed in Japanese Patent Laid-Open Application No. 59-138461 wherein an opening is formed for absorbing pressure wave of the thermal energy for the corresponding discharging port.

Furthermore, there is a full line type recording head having a length corresponding to the maximum recording width, for which the present invention can be effectively utilized. It may be possible to arrange for this type of head a structure either by combining plural recording heads disclosed in the above-mentioned specifications or by a single recording head integrally fabricated to cover such a length.

In addition, the present invention is applicable to a replaceable chip type recording head which is connected electrically with the main apparatus and can be supplied with ink when it is mounted in the main assemble, or to a cartridge type recording head having an integral ink container.

Also, to the ink container of a cartridge type recording head or the ink container of a type where the head unit and the container are separable, it may be possible to refill ink after the previous ink has been completely consumed. In such a case, it is possible to adopt a method according to the present invention that a hole is provided for the container for the ink filling or the like.

Also, it is preferable to additionally provide recording head with the recovery means and preliminarily auxiliary means which are arranged as constituents of a recording apparatus according to the present invention. These elements will contribute to enabling the effectiveness of the present invention further stabilized. To name them specifically, such elements are capping means for the recording head, cleaning means, compression or suction means, preliminary heating means such as electrothermal transducers or heating elements other than such transducing type or the combination of those types of elements, and the preliminary discharging mode besides the regular discharging for recording.

Furthermore, as a recording mode for the recording apparatus, it is not only possible to arrange a monochromatic mode mainly with black, but also it may be possible to arrange an apparatus having at least one of multi-color mode with different color ink materials and/or a full-color mode using the mixture of the colors irrespective of the recording heads which are integrally formed as one unit or as a combination of plural recording heads.

Now, in the embodiment according to the present invention set forth above, while the ink has been described as liquid, it may be an ink material which is solidified below the room temperature but liquefied at the room temperature. Since the ink is controlled within the temperature not lower than 30° C. and not higher than 70° C. to stabilize its viscosity for the provision of the stable discharging in general, the ink may be such that it can be liquefied when the applicable recording signals are given.

In addition, it may be possible to positively prevent the temperature rise due to the head or the thermal energy by using it as an energy to be consumed for changing states of the ink from solid to liquid, or use the ink which will be solidified when left intact for the purpose of preventing ink evaporation. Anyway, it may be possible to apply to the present invention the use of an ink having a nature of being liquefied only by the application of thermal energy such as an ink capable of being discharged as ink liquid by enabling itself to be liquefied when the thermal energy is given in accordance with recording signals, or an ink which will have already begun solidifying itself by the time it reaches a recording medium.

For an ink such as this, it may be possible to retain the ink as a liquid or solid material in through holes or recesses formed in a porous sheet as disclosed in Japanese Patent Laid-Open Application No. 54-56847 or Japanese Patent Laid-Open Application No. 60-71260 in order to execute a mode whereby to enable the ink to face the electrothermal transducers in such a state.

For the present invention, the most effective method for each of the above-mentioned ink materials is the one which can implement the foregoing film boiling method wherein the film boiling is thermically generated on the surface of the exothermic resistive elements.

Figure 7:
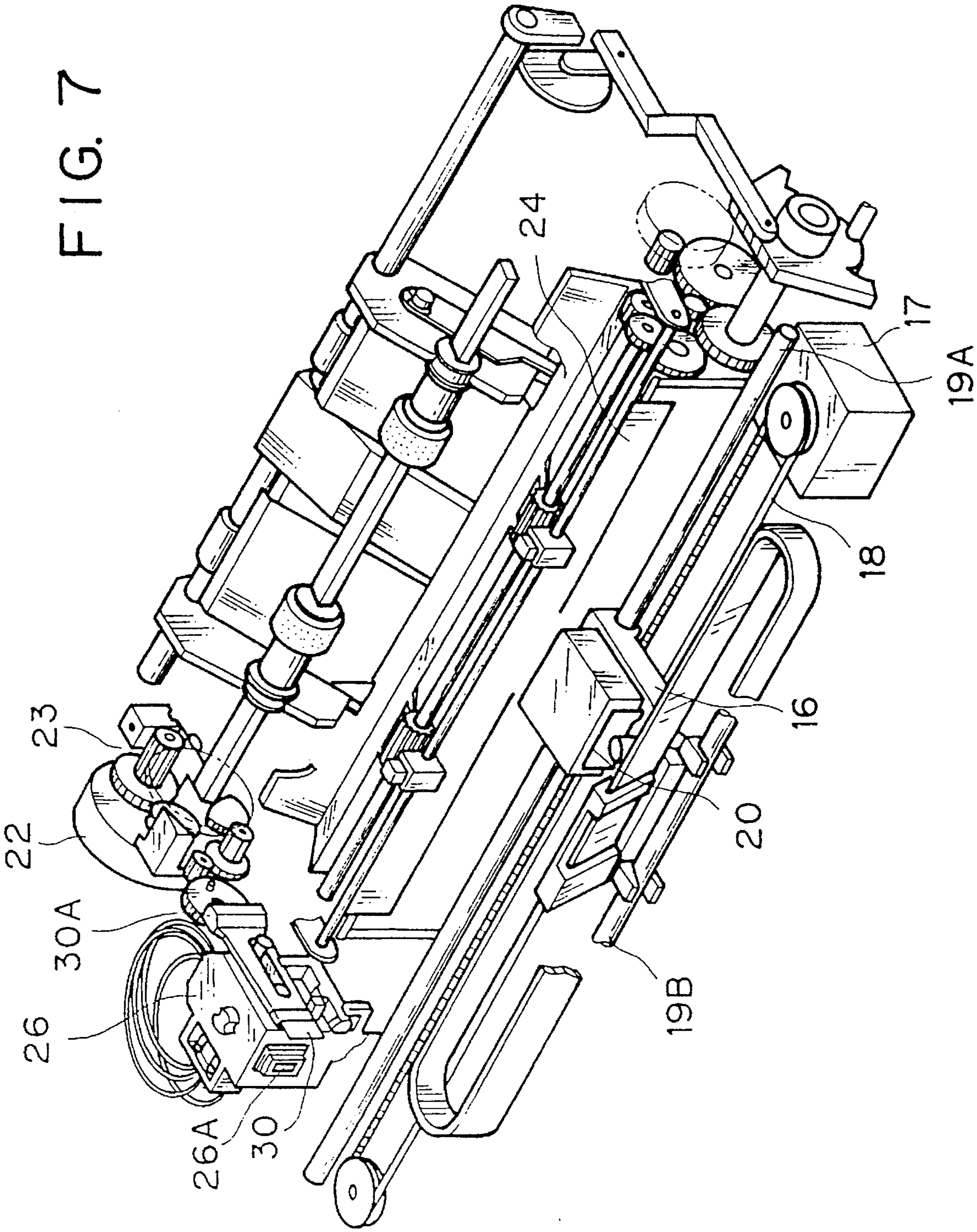
FIG. 7 is a perspective view illustrating an example of an ink jet recording apparatus wherein an ink jet recording head obtainable by the present invention is installed as an ink jet head cartridge.

FIG. 7 is an external perspective view showing an example of an ink Jet recording apparatus (IJRA) in which a recording head obtainable by the present invention is installed as an ink jet head cartridge (IJC).

In FIG. 7, a reference numeral 20 designates an ink jet head cartridge (IJC) provided with a nozzle group performing ink discharge onto the surface of a recording paper sheet serving as a recording medium being fed on a platen 24 and 16, a carriage HC holding the IJC 20 connected to a part of a driving belt 18 which transmits the driving force of a driving motor 17 and being slidable on the two guide shafts 19A and 19B arranged in parallel to enable the IJC 20 to reciprocate along the entire width of a recording sheet.

In the apparatus, there is provided driving signal supplying means to supply driving signals to the recording head for its driving.

A reference numeral 26 designates a recovery unit arranged in a position opposite to one end of the reciprocating passable of the IJC 20, its home position, for example. The head recovery unit 26 is operated by the driving force of a motor 22 through a transmission mechanism 23 to cap the IJC 20. Interlocking with this capping of the IJC 20 by the capping unit 26A of the head recovery unit 26, an ink absorption is performed by an appropriate suction means provided in the head recovery unit 26 or a pressurized ink supply is made by an appropriate pressure means provided in the ink supply passage for the IJC 20 to forcibly exhaust ink from the discharging ports, hence performing a discharging recovery process such as removal of the overly viscous ink in the nozzles. Also, at the termination of recording, the capping is performed to protect the IJC.

A reference numeral 30 designates a blade made of a silicone rubber serving as a wiping member arranged on the side of the head recovery unit 26. The blade 30 is held by a blade support 30A in a cantilever fashion. As in the case of the head recovery unit 26, it engages with the discharging port surface of the IJC 20 by the operation of the motor 22 and the transmission mechanism 23. In this way, the blade 30 is extruded into the reciprocating passage of the IJC 20 at an appropriate timing while the IJC 20 is in operation or subsequent to a discharging recovery operation by the use of the head recovery unit 26 in order to wipe off the dewdrops, wets, or dust particles adhering to the surface of the IJC 20 along with the traveling of the IJC 20.

Also, as the apparatuses to which the present invention is applicable, there are a facsimile apparatus provided with a signal receiving unit to receive signals based on an image from external apparatuses, a printing apparatus to print a cloth, and a dyeing system with which a post treatment unit is combined to provide the required post process subsequent to the fixation of ink on the printed cloth.

EMBODIMENT 1

As a sealing agent 401 for an ink jet recording head of a structure as shown in FIG. 4, a silicone RTV having 500 ppm low molecular siloxane content is used. As described earlier, 20 recording heads are fabricated. As a result of the examination on the ratio of the abnormal ink foaming for these recording heads, no abnormal ink foaming is recognized at all. Also, desirable discharging characteristics are obtained with the exception of some heads which present the twisted ink discharging but all within the allowable standard.

EMBODIMENT 2

Figure 5A:
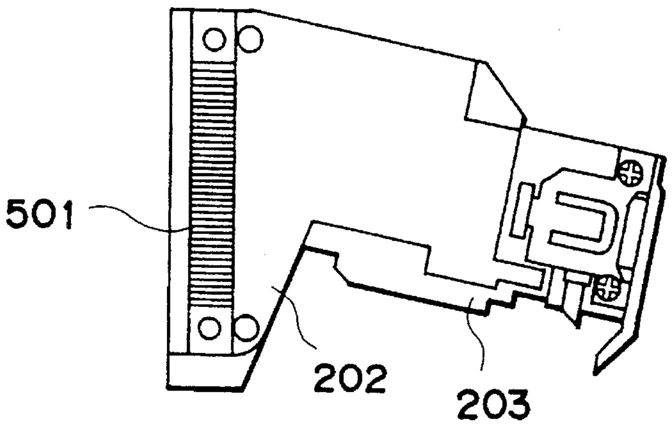
FIG. 5A is a schematic side view showing an ink jet recording head.
Figure 5B:
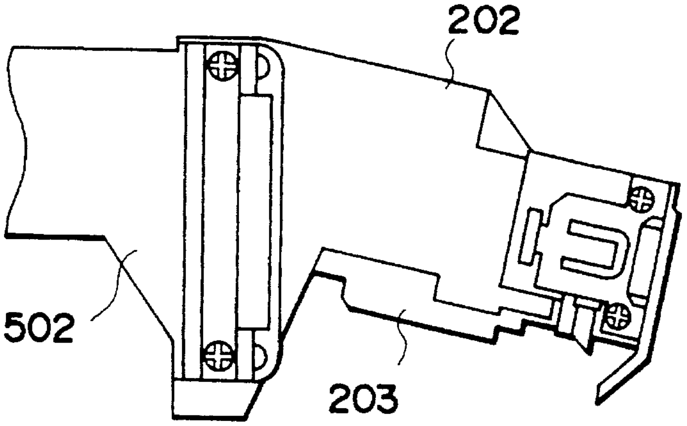
FIG. 5B is a schematic side view showing an ink jet recording head to which a flexible printed board is connected.
Figure 6:
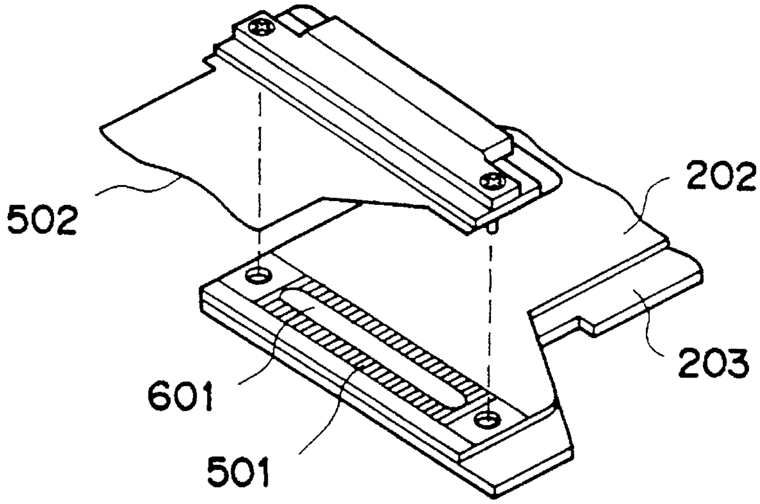
FIG. 6 is a conceptual view showing the state of an electrical connection between an ink jet recording head and a flexible printed board.

FIG. 6 shows the state where the base plate wiring 501 on the PCB 202 shown in FIG. 5A, and the wiring 502 on the flexible printed board (hereinafter referred to as FPC) shown in FIG. 5B are connected. As a sealing agent 601 which seals at least a part of the terminals or wirings, two kinds of silicone RTV having different low molecular siloxane contents, 500 ppm and 300 ppm, are used, and the examination is carried out in the same manner as in the Embodiment 1. As a result, when the silicone RTV having such a small content of the molecular siloxane as mentioned above as in the Embodiment 1, no abnormal ink foaming nor any twisted discharging out of the allowable standard is recognized.

As set forth above, according to the present invention, it is possible to reduce the occurrence frequency of abnormal ink foaming by the use of the silicone resin having a small content of low molecular siloxane as well as the low divergence of low molecular siloxane in the process of hardening or after hardening in a thermal jet recording head, leading to the significant improvement of the reliability of the thermal jet recording head, and of the yield in the fabrication of the recording heads as well.

What is claimed is:

1. An ink jet head comprising:

(a) a discharging element having (i) discharging ports for discharging ink; (ii) ink passages conductively connected to the discharging ports; and (iii) exothermic elements for applying thermal energy to ink distributed in the ink passages, and (b) a silicone resin covering at least a part of said discharge element, said silicone resin having 500 ppm or less of an amount of low molecular siloxane component of said silicone resin, said low molecular siloxane component represented by the formula $((C_3)_2SiO)_x$, wherein x is from 3 to 10.

2. An ink jet head according to claim 1, wherein the amount of said low molecular siloxane component in the silicone resin is 400 ppm or less.

3. An ink jet head according to claim 1, wherein said discharging element is supported on a supporting substrate, and at least a part of said supporting substrate is covered with said silicone resin.

4. An ink jet head according to claim 1, wherein said discharging of ink is performed by generating air bubbles in ink by film boiling due to heat generated by said exothermic elements.

5. An ink jet head according to claim 1, further comprising an ink container communicating with the ink passages of said discharge element, said container having an orifice for filling said container with ink.

6. An ink jet head comprising:

(a) a discharging element comprising (i) discharging ports for discharging ink, (ii) ink passages conductively connected to said discharging ports, (iii) exothermic elements for applying thermal energy to ink distributed in said ink passages, and (iv) wirings to supply signals to the discharging element, and (b) a silicone resin covering at least a part of said wirings, said silicone resin having 500 ppm or less of an amount of low molecular siloxane component of said silicone resin, said low molecular siloxane component represented by the formula $((CH_3)_2SiO)_x$, wherein x is 3 to 10.

7. An ink jet head according to claim 5, wherein said silicone resin covering at least a part of the wiring contains the low molecular siloxane component in an amount of 400 ppm or less.

8. An ink jet head according to claim 5, wherein said discharging element is supported on a supporting substrate, and at least a part of said discharging element and a part of said supporting substrate is covered with the said silicon resin.

9. An ink jet head according to claim 5, wherein said discharging of ink is performed by generating air bubbles in ink by film boiling due to heat generated by said exothermic elements.

10. An ink jet head according to claim 5, further comprising an ink container communicating with the ink passages of said discharge element, said container having an orifice for filing said container with ink.

11. An ink jet apparatus comprising:

an ink jet recording head comprising:

(a) a discharging element having (i) discharging ports for discharging ink; (ii) ink passages conductively connected to the discharging ports; and (iii) exothermic elements for applying thermal energy to ink distributed in the ink passages; and (b) a silicone resin covering at least a part of said discharge element, said silicone resin having 500 ppm or less of an amount of low molecular siloxane component of said silicone resin, said low molecular siloxane component represented by the formula $((CH_3)_2SiO)_x$, wherein x is from 3 to 10; and means for supplying signals to said discharging element.

12. A method for manufacturing an ink jet head comprising the following steps of:

(a) forming a discharging element having (i) discharging ports for discharging ink, (ii) ink passages conductively connected to the discharging ports, and (iii) exothermic elements for applying thermal energy to ink distributed in the ink passages and (b) covering at least a part of said discharging element with a silicone resin having 500 ppm or less of an amount of low molecular siloxane component of said silicone resin, said low molecular siloxane component represented by the formula $((CH_3)_2SiO)_x$, wherein x is from 3 to 10.

13. An ink jet apparatus comprising:

an ink jet recording head comprising:

(a) a discharging element comprising (i) discharging ports for discharging ink, (ii) ink passages conductively connected to said discharging ports, (iii) exothermic elements for applying thermal energy to ink distributed in said ink passages, and (iv) wirings to supply signals to the discharging element;

(b) a silicone, resin covering at least a part of said wirings, said silicone resin have 500 ppm or less of an amount of low molecular siloxane component of said silicone resin, said low molecular siloxane component represented by the formula $((CH_3)_2SiO)_x$, wherein x is 3 to 10; and means for supplying signals to said discharging element.

* * * * *

UNITED STATES PATENT AND TRADEMARK OFFICE

CERTIFICATE OF CORRECTION

PATENT NO. : 5,559,542

DATED : September 24, 1996

INVENTOR(S) : KEIICHIRO TSUKUDA

It is certified that error appears in the above-indentified patent and that said Letters Patent is hereby corrected as shown below:

COLUMN 1

Line 12, change "Jet" to --jet--; and
Line 49, change "technology.." to --technology.--.

COLUMN 2

Line 7, change "advantage: to --advantages:--.

COLUMN 3

Line 35, change "Jet" to --jet--;
Line 36, change "an" to --a--; and
Line 52, change "substrate.." to --substrate.--.

COLUMN 4

Line 62, change "$[(CH_3)_2SiO]_x)$" to --$((CH_3)_2SiO)_x)$--.

COLUMN 6

Line 1, change "a beyond" to --beyond--; and
Line 54, change "assemble," to --assembly,--.

UNITED STATES PATENT AND TRADEMARK OFFICE

CERTIFICATE OF CORRECTION

PATENT NO. : 5,559,542

DATED : September 24, 1996

INVENTOR(S) : KEIICHIRO TSUKUDA

It is certified that error appears in the above-indentified patent and that said Letters Patent is hereby corrected as shown below:

COLUMN 7

Line 2, change "invention" to --invention to be--; and
Line 53, change "Jet" to --jet--.

COLUMN 8

Line 3, change "passable" to --passage--.

COLUMN 9

Line 16, change "$((C_3)_2SiO)_x$," to --$((CH_3)_2SiO)_x$,--;
Line 46, change "claim 5," to --Claim 6,--; and
Line 50, change "claim 5," to --Claim 6,--.

COLUMN 10

Line 1, change "silicon" to --silicone--;
Line 3, change "claim 5," to --Claim 6,--;
Line 7, change "claim 5," to --Claim 6,--;
Line 10, change "filing" to --filling--;
Line 23, change "and means" to --and ¶ means--;
Line 31, change "and (b)" to --and ¶ (b)--;
Line 44, change "element;" to --element; and--;

UNITED STATES PATENT AND TRADEMARK OFFICE
CERTIFICATE OF CORRECTION

PATENT NO. : 5,559,542 Page 3 of 3
DATED : September 24, 1996
INVENTOR(S) : KEIICHIRO TSUKUDA It is certified that error appears in the above-indentified patent and that said Letters Patent is hereby corrected as shown below:

COLUMN 10

Line 45, change "silicone," to --silicone--;
Line 46, change "have" to --having--; and
Line 50, change "and means" to --and ¶ means--.

Signed and Sealed this

Sixth Day of May, 1997

Attest:

BRUCE LEHMAN

Attesting Officer

Commissioner of Patents and Trademarks